United States Patent
Yebka et al.

(10) Patent No.: US 11,063,453 B2
(45) Date of Patent: Jul. 13, 2021

(54) SUPPLEMENTAL BATTERIES FOR ELECTRONIC DEVICES

(71) Applicant: Lenovo (Singapore) Pte. Ltd., Singapore (SG)

(72) Inventors: Bouziane Yebka, Apex, NC (US); Joseph Anthony Holung, Wake Forest, NC (US); Philip John Jakes, Durham, NC (US); Tin-Lup Wong, Chapel Hill, NC (US); Joseph David Plunkett, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 260 days.

(21) Appl. No.: 15/346,255

(22) Filed: Nov. 8, 2016

(65) Prior Publication Data
US 2018/0131227 A1   May 10, 2018

(51) Int. Cl.
*H02J 9/00* (2006.01)
*H02J 7/00* (2006.01)
*G06F 1/26* (2006.01)
*G06F 1/16* (2006.01)
*H02J 7/34* (2006.01)

(52) U.S. Cl.
CPC .......... *H02J 7/0063* (2013.01); *G06F 1/1635* (2013.01); *G06F 1/263* (2013.01); *H02J 7/0026* (2013.01); *H02J 7/0032* (2013.01); *H02J 7/342* (2020.01); *H02J 2007/0067* (2013.01)

(58) Field of Classification Search
CPC .... H02J 9/00; H02J 7/0021; H02J 1/10; H02J 7/0063; H02J 7/0026; H02J 7/0032; H02J 2007/0067; H02J 7/0054; H02J 7/342; G06F 1/1635; G06F 1/263
USPC .......................................................... 307/64
See application file for complete search history.

(56) References Cited

U.S. PATENT DOCUMENTS

| | | | |
|---|---|---|---|
| 8,390,255 B1* | 3/2013 | Fathollahi | H02J 7/0045 206/308.3 |
| 2008/0179957 A1* | 7/2008 | Tsui | H02J 7/342 307/66 |
| 2009/0096417 A1* | 4/2009 | Idzik | H02J 7/0044 320/115 |
| 2011/0183169 A1* | 7/2011 | Bhardwaj | H01M 10/0431 429/94 |
| 2015/0169015 A1* | 6/2015 | Yebka | G06F 1/203 361/679.54 |
| 2016/0179182 A1* | 6/2016 | Horie | G06F 1/1626 713/323 |
| 2018/0120915 A1* | 5/2018 | Li | G06F 1/3212 |

\* cited by examiner

*Primary Examiner* — Richard Tan
(74) *Attorney, Agent, or Firm* — Ference & Associates LLC

(57) ABSTRACT

One embodiment provides a device, including: a display device disposed in a device housing; a main battery disposed in the device housing; a supplemental battery disposed proximate to the display device; and a processor operatively coupled to the display device. Other aspects are described and claimed.

17 Claims, 7 Drawing Sheets

SUPPLEMENTAL BATTERIES FOR ELECTRONIC DEVICES

BACKGROUND

Electronic devices such as laptops, tablet computers and the like operate using battery power, particularly when used as a mobile device. Conventionally a main battery pack, which may include one or more battery cells, provides power to the system. Because increased battery capacity is desirable, e.g., to boost running time of the system as well as to increase the amount of tasks that can be performed by the system, efforts have been made to boost the capacity of the main battery pack.

Supplemental battery packs have been used to increase the available power, where the supplemental pack increases the overall capacity or peak energy of the power supply. Conventional approaches to providing a supplemental battery pack have focused on providing power to the system using the supplemental pack, i.e., the supplemental battery packs are typically designed to be able to power the full system on their own.

BRIEF SUMMARY

In summary, one aspect provides a device, comprising: a display device disposed in a device housing; a main battery disposed in the device housing; a supplemental battery disposed proximate to the display device; and a processor operatively coupled to the display device.

Another aspect provides a device, comprising: a display device disposed in a display device housing; a main battery disposed in a main device housing; said display device housing and said main device housing being attached by one or more hinges; a supplemental battery disposed proximate to the display device within the display device housing; and a processor disposed in the main device housing that is operatively coupled to the display device.

A further aspect provides a display device, comprising: a display panel disposed in a device housing; a plurality of battery cells disposed proximate to the display device; and a printed circuit board operatively coupled to the plurality of battery cells.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment provides an electronic device with one or more supplemental battery packs. In an embodiment, the supplemental battery pack need not be large, as it may act to increase the longevity (running time) of the main pack in a variety of ways, whereas the supplemental battery pack may not be powerful enough to power the full system for an appreciable length of time.

In accordance with the various example embodiments described in connection with the figures, the supplemental battery pack may be provided in a parasitic arrangement, where the main battery pack draws power from the supplemental battery pack.

Additionally or in the alternative, the supplemental battery pack may act as a dedicated power source for a particular device component, e.g., a wireless sub-system, a display device component, etc., where the main battery pack provides power to the remainder of the system.

In an embodiment, a supplemental battery pack comprising a plurality of cells is disposed behind a display panel in the display case of the system, e.g., a laptop computer.

The illustrated example embodiments will be best understood by reference to the figures. The following description is intended only by way of example, and simply illustrates certain example embodiments.

Figure 1:
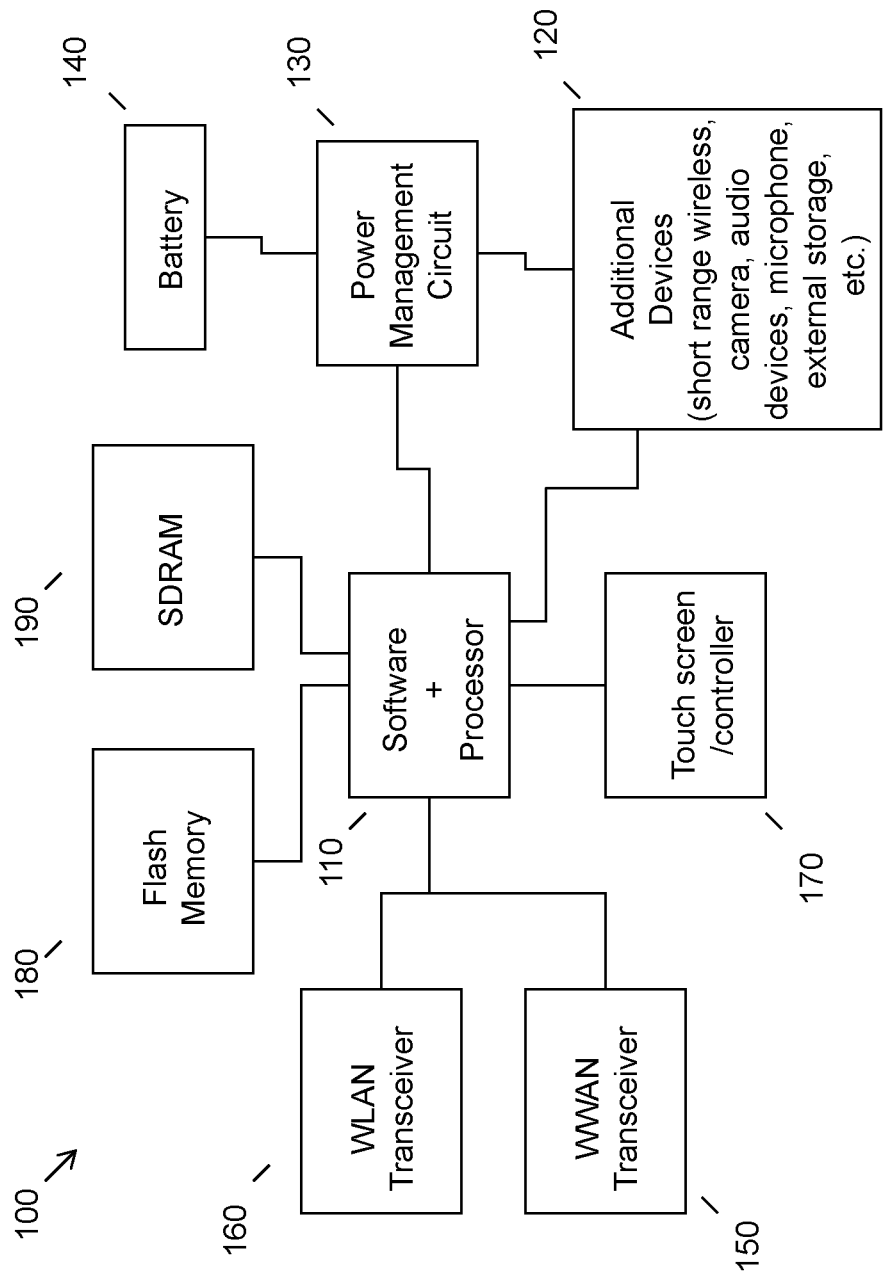
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery or battery pack 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and SDRAM 190.

Figure 2:
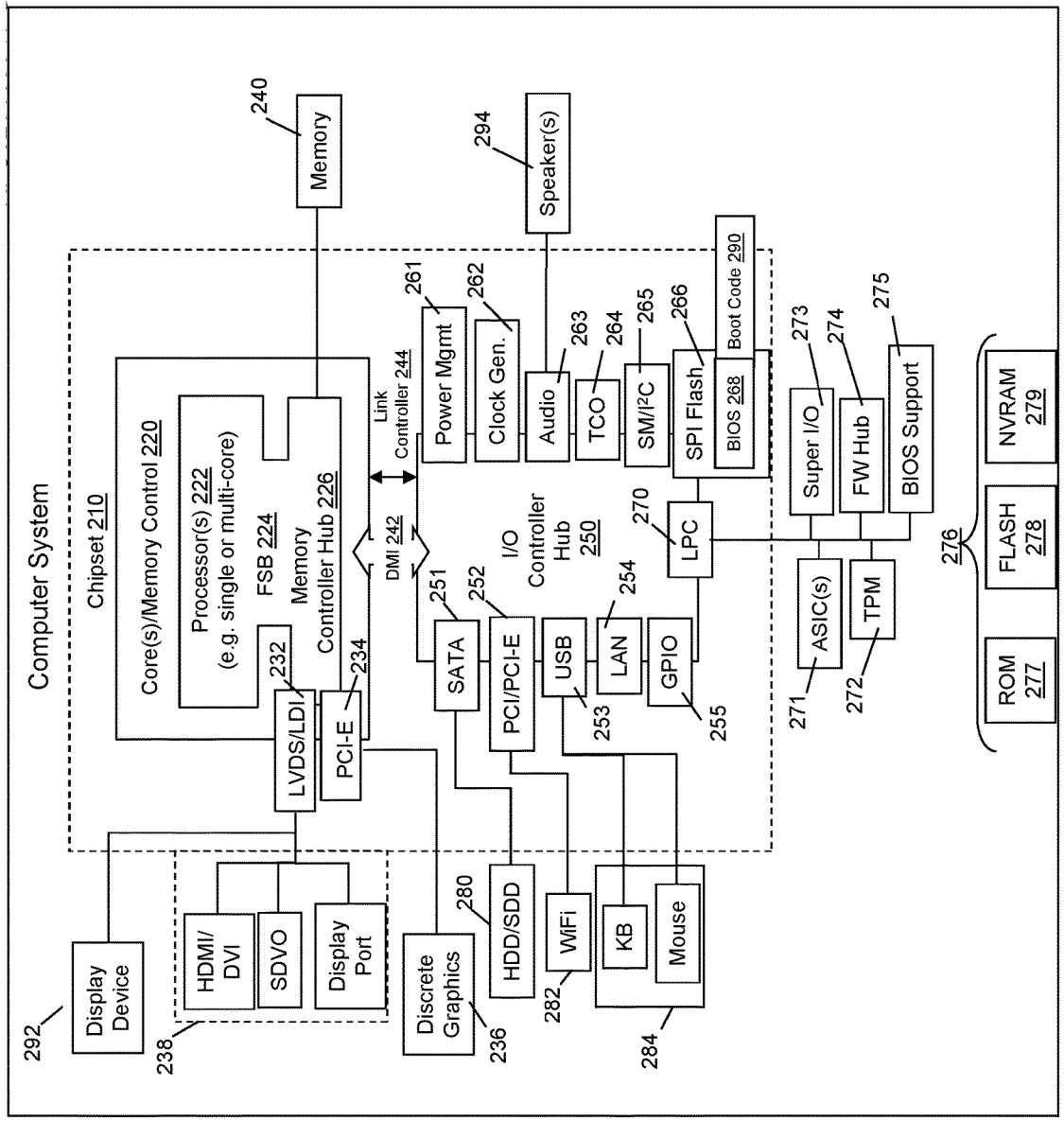
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which operate using power supplied form a battery pack comprising one or more battery cells. For example, the circuitry outlined in FIG. 1 may be implemented in a tablet or smart phone embodiment, whereas the circuitry outlined in FIG. 2 may be implemented in a personal computer embodiment.

Figure 3A:
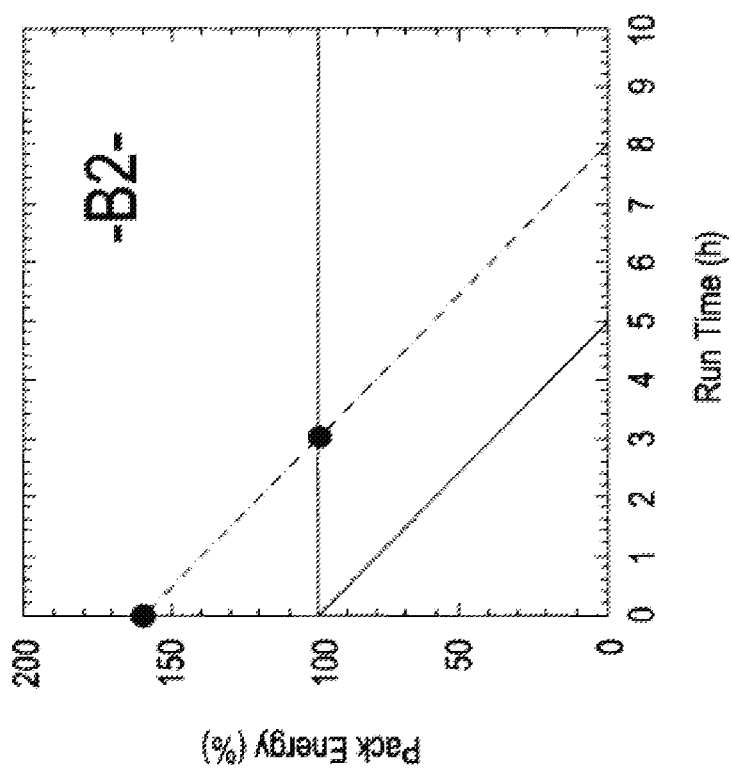
FIG. 3(A-C) illustrates examples of peak energy versus runtime for various supplemental battery pack arrangements.

Referring now to FIG. 3(A-C), an embodiment uses the fact that a supplemental battery need not provide enough power to actually power the entire system in order to benefit the performance characteristics of the power system overall. Shown in FIG. 3A is an example in which the supplemental battery pack is provided to a system in the form of a large, conventional style supplemental battery pack. That is, the supplemental battery pack is made to be approximately equal in power to the main battery pack, boosting the peak energy from 100 percent to approximately 160 percent when added to the system. As such, the supplemental battery pack may run and power the entire system itself, e.g., when the main battery pack has been exhausted. Thus, whereas the main battery pack may offer about 5 hours running time (represented by the solid line), the main battery pack and the supplemental battery pack together offer about 8 hours of running time (represented by the dashed line).

However, it will be readily appreciated that in order to provide such a powerful supplemental battery pack, additional space is required for the supplemental cell(s). Typically, electronic device form factors (laptops, tablets, etc.) are trending toward smaller dimensions, leaving less internal space for providing a supplemental pack. This leads to inclusion of external supplemental battery packs, which may be aesthetically unpleasant.

Figure 3C:
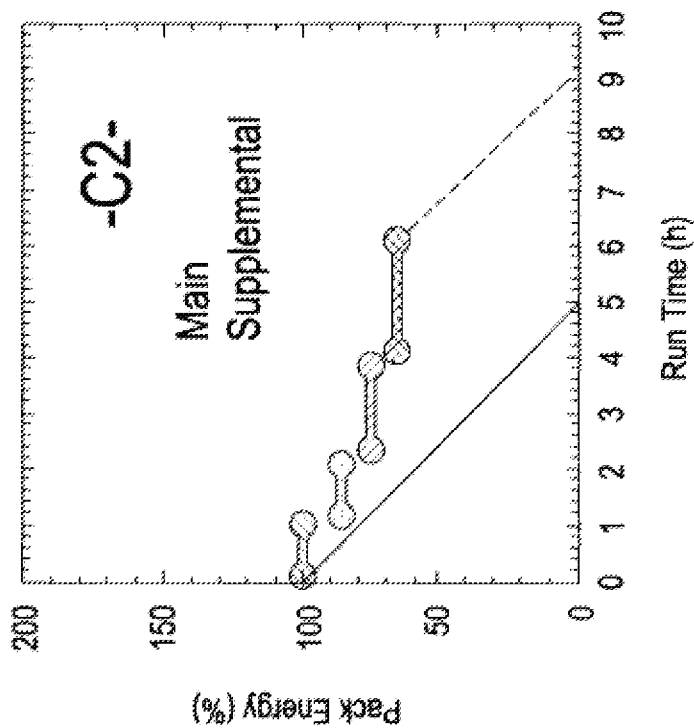
Figure 3B:
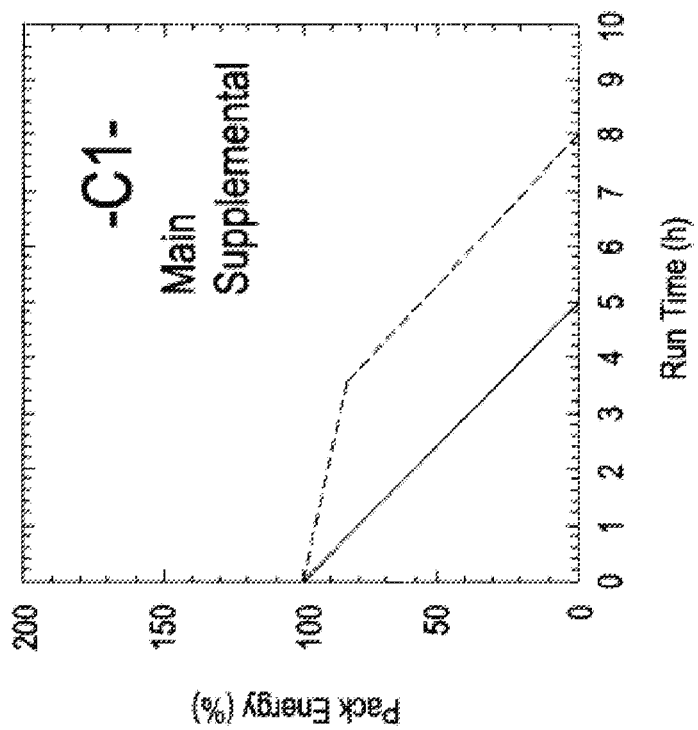

As shown in FIG. 3B, a smaller supplemental pack, e.g., with half the watt-hours of the main battery pack, may be added to the system and provide an adequate boost to the main battery pack such that increased run times are achieved, even if the supplemental battery pack is too small to power the main system. By way of example, FIG. 3B shows the increase in run time (dashed line) that occurs if a smaller supplemental battery pack is added is comparable to when a larger supplemental battery pack is added. The main battery pack alone is again represented by the solid line in FIG. 3B.

FIG. 3C illustrates that, as with FIG. 3B, smaller supplemental battery packs may provide increased run times to the system overall. As illustrated, four smaller supplemental battery packs, illustrated by horizontal lines, may be included within the system case and utilized, e.g., serially, in order to offload some of the demands placed on the main battery pack, represented by the solid line. Again, while none of the supplemental battery packs individually have enough capacity to power the full system, and collectively they do not boost the peak energy, dramatically increased run times are achievable. Thus, when these smaller supplemental battery packs are exhausted, the main battery pack may again take over all system power supply duties, as illustrated by the dashed line in FIG. 3C.

A supplemental battery pack may be provided such that the main battery pack draws power from the supplemental battery pack in a parasitic fashion. Alternatively or in addition, a supplemental battery pack may be dedicated to a particular system component, offloading from the main battery pack, even if temporarily, the demand for power from that component. A combination of the foregoing techniques may be applied.

Figure 4:
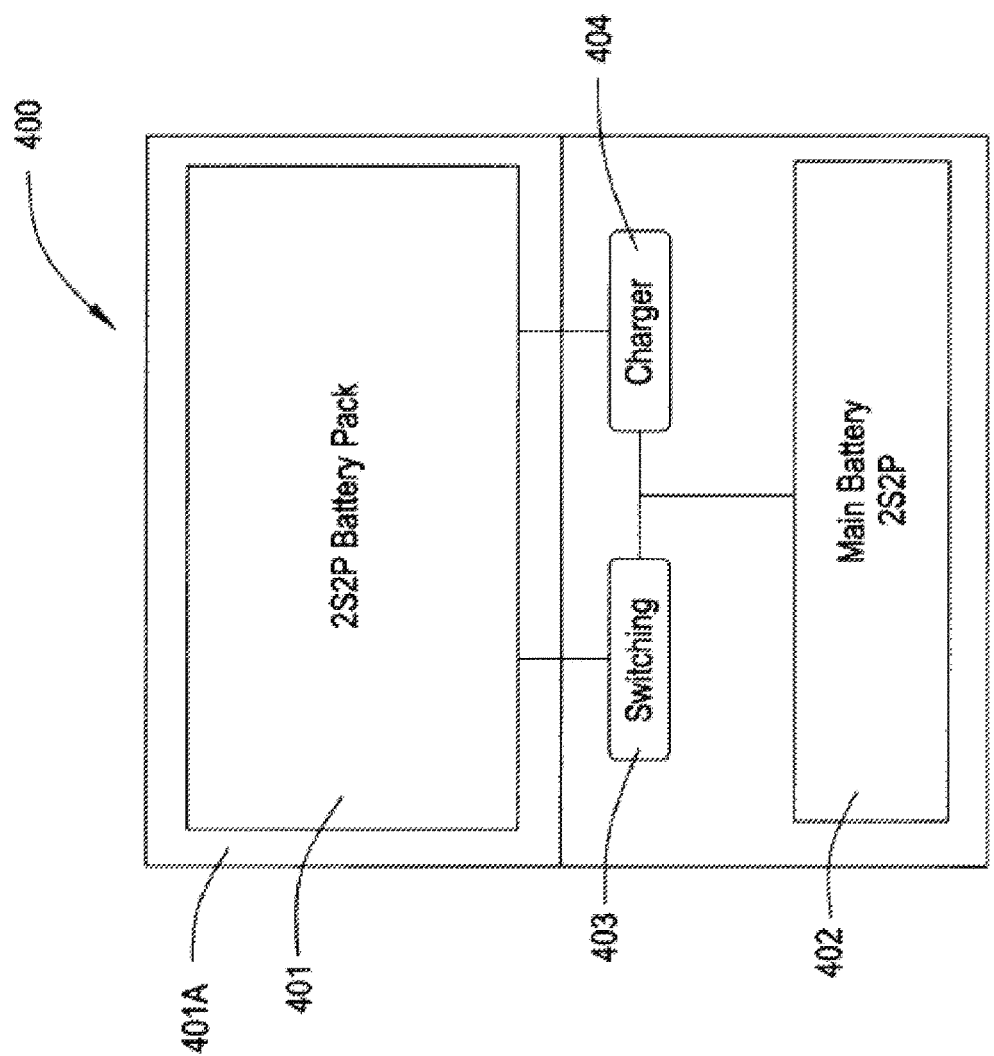
FIG. 4 illustrates an example electronic device having a supplemental battery pack.

As may be appreciated from FIG. 4, the smaller size of the supplemental battery pack permits its inclusion within the system case or other case (e.g., display case), i.e., in areas where conventional supplemental battery packs are not capable of being placed due to their size.

FIG. 4 shows an example where an electronic device 400 has a supplemental battery pack 401, wherein four battery cells are provided in a two serial, two parallel (2S2P) arrangement (although this is simply a non-limiting example), which may be placed within the display casing or housing 401a, or other area(s). For example, the supplemental battery pack 401 may include cells that are planar (flat, thin cells) that may be included in the display casing, e.g., behind a flat panel display screen. This area is typically not utilized for battery cell placement; however, given the smaller size the cells of the supplemental battery pack 401, this area within the display casing may be used.

The supplemental battery pack 401 may be placed in a parasitic arrangement with the main battery pack 402 (here shown as including four cells in a 2S2P arrangement) via switching mechanism 403 and/or the supplemental battery pack 401 may be placed in a dedicated arrangement to temporarily provide a power source to a system component, e.g., components of the display casing.

Switching mechanism 403 may operate to switch power sources, e.g., first using the supplemental battery pack 401 to power a system component such as a display panel and thereafter, e.g., when the supplemental battery pack 401 falls below a predetermined charging amount, switch the power source to be supplied by the main battery pack 402. A charger 404 may be provided for charging the supplemental battery pack 401, the main battery pack 402, or both.

Figure 5:
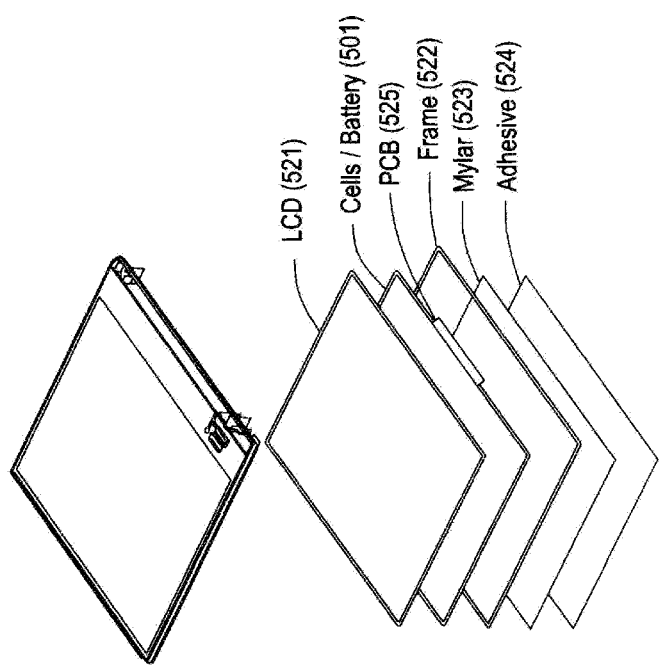
FIG. 5 illustrates an exploded view of a display device having a supplemental battery pack therein.

Illustrated in FIG. 5 is an example of display device components having a supplemental battery pack 501 therein. As illustrated in FIG. 5, an LCD 521, a four (4) cell supplemental battery pack 501 (e.g., 2S2P battery pack), a frame 522, a Mylar® insulation layer 523 and adhesive 524 are included as internal components of the display device, along with a printed circuit board 525. These components are layered in the display device housing (not shown in FIG. 5) in order to utilize space behind the LCD 521, e.g., normally occupied by a non-functional spacer. The battery pack for example includes 4 flat, rectangular cells arranged in either serial or parallel arrangement (or a combination thereof). Thus, an embodiment provides a supplemental battery pack, as described herein, behind the LCD 521 within the display device. Mylar® is a registered trademark of E. I. Du Pont Nemours and Company in the United States and other countries.

As shown in Table 1, varying degrees of power supplementation may be achieved by utilizing the space behind the LCD 521 in the display device, e.g., depending on the size of the display. The examples of Table 1 are for a supplemental battery pack having 4 (four) cells provided in a serial arrangement.

TABLE 1

Additional Power Behind LCD

| | Screen Size (diagonal) | | | | | | | |
|---|---|---|---|---|---|---|---|---|
| | 7.6 × 4.5 (8.9) | 8.74 × 4.92 (10.1) | 9.6 × 7.3 (12.1) | 10.2 × 6.4 (12.1) | 11.3 × 7.1 (13.3) | 11.3 × 8.4 (14.1) | 12 × 7.4 (14.1) | 13.1 × 8.2 (15.4) |
| Power Supplement | 8.6 Wh | 9.8 Wh | 11.7 Wh | 11.8 Wh | 12.9 Wh | 13.7 Wh | 13.8 Wh | 14.9 Wh |

Figure 6:
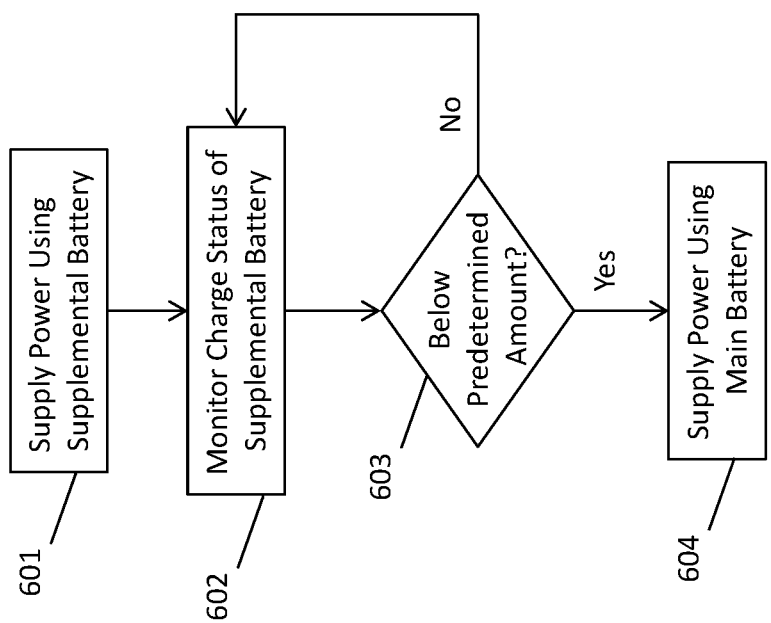
FIG. 6 illustrates an example method of utilizing a supplemental battery pack.

In an embodiment, an electronic device may be provided with one or more supplemental battery packs, where the supplemental battery packs include one or more battery cells. As shown in FIG. 6, an embodiment automatically acts to manage the utilization of the supplemental battery packs so as to maximize the run time of the system. An example is as follows.

At 601 an embodiment uses the supplemental battery pack to provide power to a component, which may include a device sub-system such as a wireless communications sub-system, an LCD panel, etc., or may include the main battery itself. This permits the supplemental battery pack to assist a main battery pack that supplies power the electronic device.

At 602 an embodiment monitors the charge status (or other relevant parameter) of the supplemental battery pack. If the supplemental battery pack's charge status (e.g., percent charge) falls below a predetermined amount at 603, an embodiment may switch the supplemental battery pack off and thereafter utilize the main battery pack at 604, e.g., to power the sub-system assigned to the supplemental battery pack, or the main battery pack may no longer draw power from the supplemental battery pack.

An embodiment therefore represents a technical improvement in terms of power management for electronic devices. An embodiment utilizes one or more smaller, supplemental battery packs to assist a main battery pack in providing system power. In this way, the smaller battery pack(s) may be arranged within a system casing using space that is typically underutilized or considered unusable. As such, the smaller supplemental battery packs may come in non-uniform shapes and sizes, e.g., asymmetric cell shapes may be used, as for example dictated by the available space within the system case.

The small size (as compared to the main battery pack) also permits atypical connection of the battery pack cells. For example, a battery cell or cells may be arranged as is typical (e.g., in serial or parallel arrangement), but physically removed to another, available space within the system casing and/or display casing. This permits physically separated cells to be arranged as a unit or pack.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device, comprising:
   a display device disposed in a display casing of a device housing;
   a main battery disposed in the device housing;
   a supplemental battery comprising at least one battery pack and disposed within the display casing proximate to the display device, wherein the supplemental battery provides power to one or more components disposed in the display casing of the device housing, the one or more components not being associated with charging at least one of: the main battery and the supplemental battery, wherein when the supplemental battery provides power to the one or more components, the main battery does not provide power to the one or more components, wherein the supplemental battery comprises a battery having a smaller battery capacity than the main battery and wherein the smaller battery capacity does not provide enough battery capacity to, by itself, power a full system of the device;
   a switching mechanism that switches a power provision designation for the one or more components from the supplemental battery to the main battery when a charge of the supplemental battery falls below a predetermined threshold; and
   a processor operatively coupled to the display device.

2. The device of claim 1, wherein the display device comprises a display panel, and further wherein the supplemental battery is disposed between the display panel and an insulating layer.

3. The device of claim 1, wherein the supplemental battery comprises a plurality of battery cells.

4. The device of claim 3, wherein the plurality of battery cells are electrically arranged in series.

5. The device of claim 3, wherein the plurality of battery cells are electrically arranged in parallel.

6. The device of claim 3, wherein the plurality of battery cells are electrically arranged in a combination of serially linked cells and cells arranged in parallel.

7. The device of claim 1, wherein the one or more components comprises a display panel of the display device.

8. A device, comprising:
a display device disposed in a display casing of a display device housing;
a main battery disposed in a main device housing;
said display device housing and said main device housing being attached by one or more hinges;
a supplemental battery comprising at least one battery pack and disposed within the display casing proximate to the display device, wherein the supplemental battery provides power to one or more components disposed in the display casing of the display device housing, the one or more components not being associated with charging at least one of: the main battery and the supplemental battery, wherein when the supplemental battery provides power to the one or more components, the main battery does not provide power to the one or more components, wherein the supplemental battery comprises a battery having a smaller battery capacity than the main battery and wherein the smaller battery capacity does not provide enough battery capacity to, by itself, power a full system of the device;
a switching mechanism that switches a power provision designation for the one or more components from the supplemental battery to the main battery when a charge of the supplemental battery falls below a predetermined threshold; and
a processor disposed in the main device housing that is operatively coupled to the display device.

9. The device of claim of 8, wherein the supplemental battery powers the one or more components disposed in one or more of the display device housing and the main device housing.

10. The device of claim 8, wherein the display device comprises a display panel, and further wherein the supplemental battery is disposed between the display panel and an insulating layer.

11. The device of claim 8, wherein the supplemental battery comprises a plurality of battery cells.

12. The device of claim 11, wherein the plurality of battery cells are electrically arranged in series.

13. The device of claim 11, wherein the plurality of battery cells are electrically arranged in parallel.

14. The device of claim 11, wherein the plurality of battery cells are electrically arranged in a combination of serially linked cells and cells arranged in parallel.

15. The device of claim 8, wherein the display device housing comprises a printed circuit board operatively connected to the supplemental battery.

16. The device of claim 15, wherein the supplemental battery is connected to the main battery via the printed circuit board.

17. The device of claim 16, wherein the supplemental battery is parasitically connected to the main battery.

* * * * *